May 11, 1965    C. H. JONES ETAL    3,182,512
ANGULAR VELOCITY MEASURING DEVICE
Filed April 27, 1961                    3 Sheets-Sheet 1

WITNESSES

INVENTORS
Charles H. Jones, George R. Douglas
& John H. Thompson
BY
PATENT AGENT

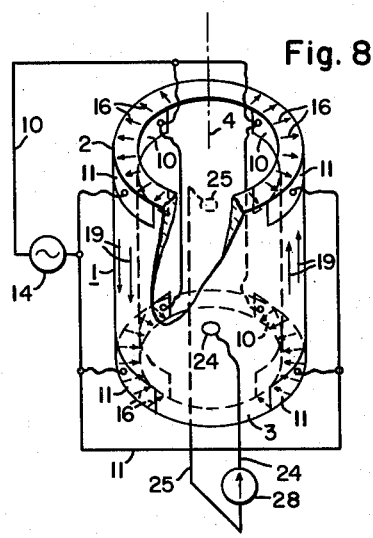
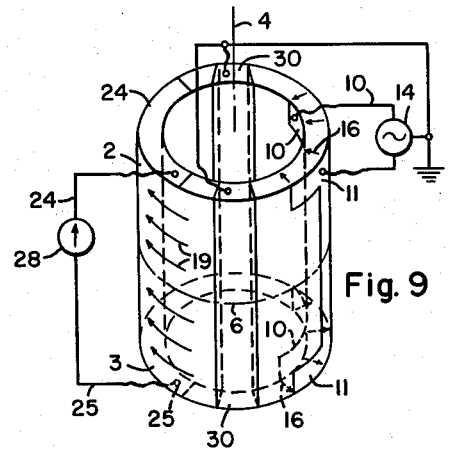
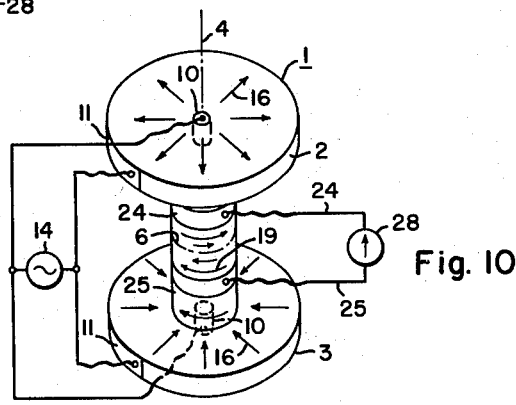
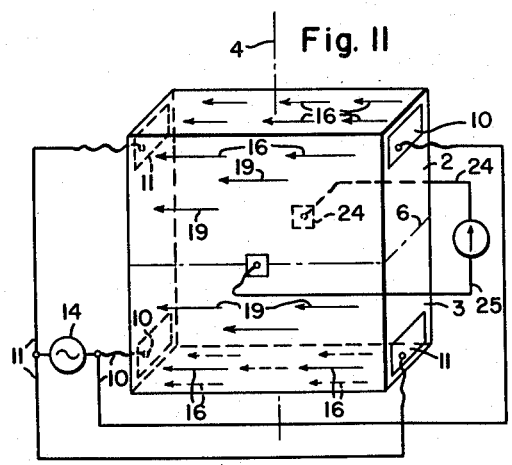
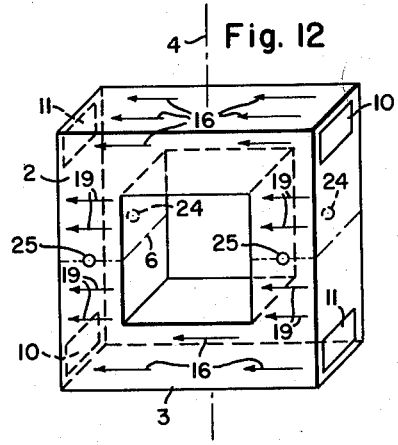

May 11, 1965 C. H. JONES ETAL 3,182,512
ANGULAR VELOCITY MEASURING DEVICE
Filed April 27, 1961 3 Sheets-Sheet 3

United States Patent Office 3,182,512
Patented May 11, 1965

3,182,512
ANGULAR VELOCITY MEASURING DEVICE
Charles H. Jones, Murrysville, John H. Thompson, Penn Hills, and George R. Douglas, Wilkinsburg, Pa., assignors to Westinghouse Electric Corporation, East Pittsburgh, Pa., a corporation of Pennsylvania
Filed Apr. 27, 1961, Ser. No. 106,116
13 Claims. (Cl. 73—505)

This invention relates to devices for measuring rates of turning, i.e. angular velocity, and more particularly to vibratory gyro devices for this purpose.

The present invention further relates to improvement of a previous simplified form of vibratory gyro device, such as disclosed in United States patent application Serial No. 51.328, filed August 23, 1960, by Arthur L. Simmons et al., and assigned to the assignee of the present application, in which is exemplified a single element acting as the vibratory mass, the yieldable driven or translational constraint means, the yieldable output constraint means, the transducer means for effecting vibration of the mass, and the signal output mass.

While the proposed vibratory gyro device of the aforesaid patent application possesses many advantages with respect to simplicity, reliability, compactability, etc., over previous vibratory gyro devices, its self-vibrated-mass-and-signal-producing element depends upon reaction from the mounting base of the device for its output mode and resonant frequency of vibration. This complicates the construction of the device, inasmuch as the base becomes part of the vibratory system in the output mode and affects the tuning and stability of the self-vibrated-mass and signal-producing element in said mode.

It becomes a prime object of the present invention, therefore, to provide an improved vibratory gyro device employing a self-driven mass and signal-producing element, or intimately-associated assemblage, which is free from undesirable influence by the mounting base of such device in either its driven mode of vibration or its output mode of vibration.

In accord with the preceding object it becomes another object of the present invention to provide such simplified type of vibratory gyro device in which the self-vibrated-mass and signal-producing element comprises oppositely-arranged symmetrical portions, each portion acting as an oppositely-driven balanced vibratory mass system and each portion vibrating 180° out of phase with respect to vibration of the other portion, whereby one portion reacts to the other in the output or precessional mode of vibration of the device, together with an output signal portion which is responsive to the reaction between the aforesaid oppositely-arranged symmetrical portions.

In accord with the preceding object, it becomes another object of the present invention to provide such simplified vibratory gyro device in which the self-vibrated-mass and signal-producing element is of a form and of a material which affords simplicity of construction.

In accord with the preceding objects, it is still another object of the present invention to provide a vibratory gyro device comprising a self-vibrated-mass and signal-producing element which permits mounting on a base through a medium which enables orientation influence of said element from said base without affecting the driven and output modes of vibration of said element.

Other objects and advantages of the invention will become apparent from the following description when taken in conjunction with the accompanying drawing, in which:

FIGS. 8 and 9 are three-dimensional views of the element of FIGS. 1 to 5 in the preferred hollow cylinder form, showing possible arrangements for location of the electrodes and polarization of such element when made of ceramic ferroelectric material;

FIGS. 10, 11 and 12 illustrate in three-dimensional views three possible alternate configurations which the self-vibrated-mass and signal-producing element may take;

Figure 16:
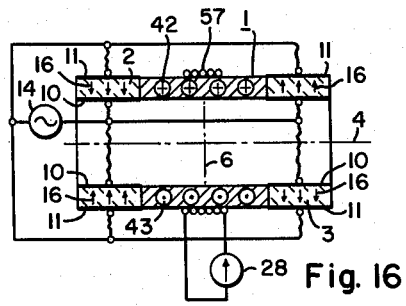
Figure 15:
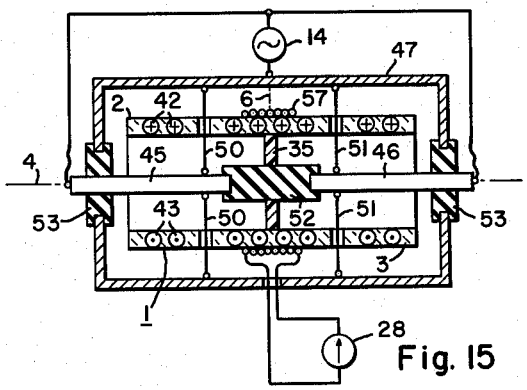
Figure 17:
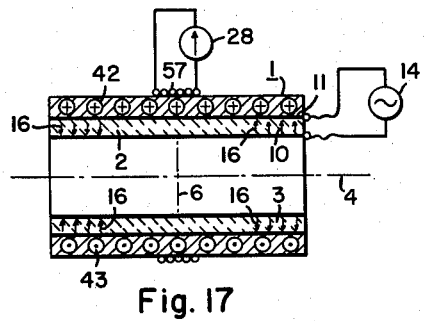
Figure 18:
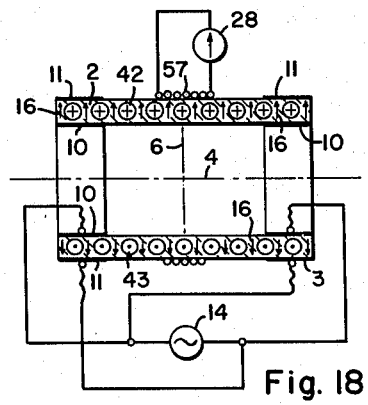

FIG. 15 is a cross-sectional view of an exemplification of the self-vibrated-mass and signal-producing element in preferred hollow cylinder form, as employing magnetostrictive, or ferromagnetic material; and FIGS. 16, 17 and 18 illustrate alternate embodiments of the self-vibrated-mass and signal-producing element in preferred hollow cylinder form as comprising combinations of ferroelectric and ferromagnetic materials.

As employed herein the terms "self-driven" and "self-vibrated" are to be taken in the sense that mechanical or vibratory forces are developed internally in the element, material, mass, etc., with which these terms are used, directly in response to an applied electric or magnetic field, in accord with exhibiting electrostrictive and magnetostrictive properties, respectively.

Figure 1:
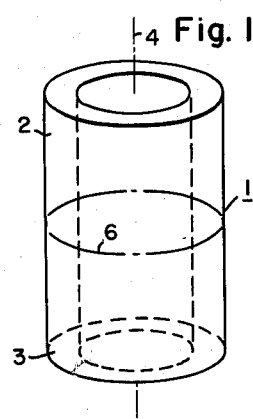
FIGURE 1 is a three-dimensional view illustrating the mass distribution of a preferred hollow cylindrical form of the self-vibrated-mass and signal-producing element in its relaxed, non-vibrating, non-excited state.
Figure 2:
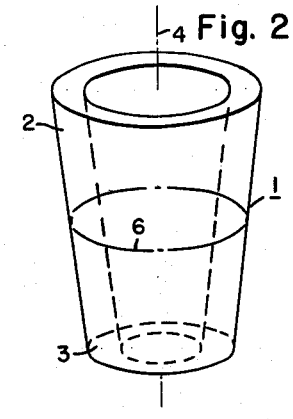
FIGS. 2 and 3 are similar views of the element of FIG. 1 showing with exaggeration the mass distribution of such element during successive half-cycles of vibration in the driven mode.
Figure 3:
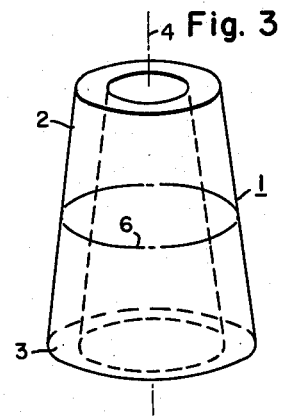
Figure 4:
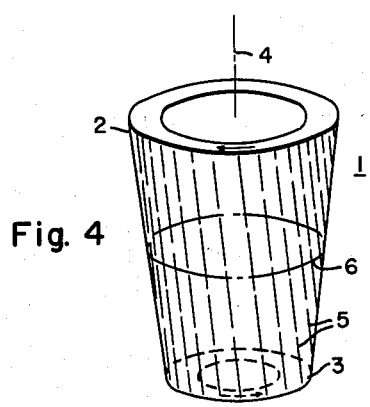
FIGS. 4 and 5 are similar views of the element of the preceding FIGS. 1 to 3, showing with exaggeration the strain reaction in such element during the successive half cycles of the driven mode corresponding to FIGS. 2 and 3, respectively, while such element is being turned about its input axis.
Figure 5:
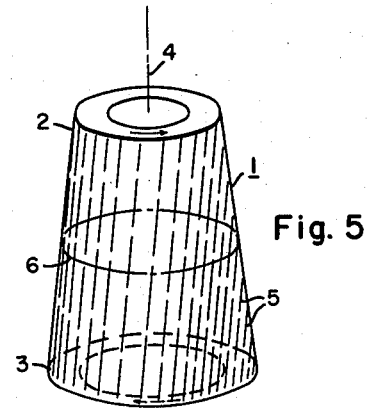

Referring now to FIG. 1, in accord with a feature of the invention, the previously-mentioned self-vibrated-mass and signal-producing element or intimately associated assemblage is identified by the reference numeral 1 and is shown in FIG. 1 in the preferred form of a hollow cylinder preferably made of a ceramic ferroelectric material having piezoelectric properties, such as barium titanate or lead zirconium titanate, for example, which, in being readily polarizable in selective directions, affords a material particularly suited for the instant use.

In accord with principles of operation of the element 1, as exemplified in the showings of FIGS. 1 to 7, spaced apart portions 2 and 3 are suitably excited, as will be explained hereinafter, to vibrate in a radial mode relative to an input axis 4 whereby each of the portions 2 and 3 alternately expands and contracts and the portion or portions 2 vibrates 180° out of phase with respect to vibration of the opposite portion or portions 3. This type of motion often will be referred to herein as "push-pull radial."

Figure 6:
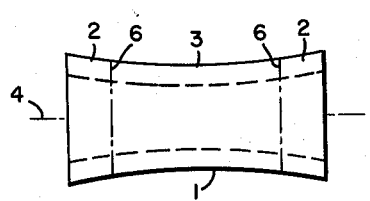
FIGS. 6 and 7 are views in outline of another self-vibrated-mass and signal-producing element in a preferred hollow cylinder form showing with exaggeration the mass distribution while driven at a frequency corresponding to a mode of higher order than that illustrated in FIGS. 1 to 5.
Figure 7:
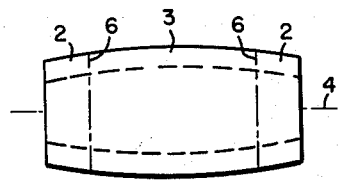

In the showings in FIGS. 1 to 5, and 8 to 18, the mode of relative radial vibration between the portions 2 and 3 is fundamental, such portions being located at opposite ends, respectively, of the element 1, and has a nodal plane 6, perpendicular to the input axis 4 and indicated at its intersection with the outer surface of such element by the dot-and-dash line, which is equidistant opposite ends of such element. In FIGS. 6 and 7 the portions 2 and 3 are located at opposite ends of element 1 and in the middle, respectively, so that such relative radially-driven vibration between such portions as exemplified is at a mode of higher order, a second order mode in this instance, and a number of nodal planes 6 for this higher order driven vibration mode exist.

When the element 1 is turned about the input axis 4 a torsional, vibratory reaction in element 1 occurs between its relatively expanding and contracting portions 2 and 3 as a result of the difference in the moments of inertia of these portions about such axis, in accord with law of conservation of angular momentum. This vibratory strain reaction is schematically represented by the dash lines 5 in FIGS. 4 and 5 and assumes a phase relative to the radial vibration of portions 2 and 3 which is in accord with the direction of such rotary movement of element 1 about the input axis.

It will be appreciated that the showing of the radial and torsional strain of element 1 in FIGS. 1 to 7 is grossly exaggerated for sake of illustration and in actuality is not apparent in observing the element during such action.

Referring to FIG. 8, the element 1 in its preferred hollow cylinder form may be made of ceramic ferroelectric materials, such as barium titanate, and may comprise an electrode arrangement in which the surfaces are coated with a metallic material, as by electro-deposition of silver, by painting with a silver-particle-containing paint, or other suitable means and method to provide for the vibration-excitation input to such element. Input electrodes 10 and 11 are formed on the inner and outer surfaces, respectively, of element 1 at its opposite ends, which are joined via such as external flexible leads, identified by the same reference numerals, and to the terminals of an alternating current excitation source 14. The opposite end portions 2 and 3 of the ceramic ferroelectric element 1 are oppositely polarized in a radial direction relative to input axis 4 as indicated by the arrows 16 and this may be accomplished by application of a suitable direct current voltage between the excitation input electrodes 10 and 11 at one end of element 1 and, of reverse polarity, between the corresponding electrodes at the other end of said element, simultaneously at a suitable temperature which is about 300° F. for barium titanate, for example, the D.C. polarizing voltage will vary in accord with the material and its thickness. For a hollow barium titanate cylinder element 1 which is 1/10 of an inch thick, this will be approximately 2000 volts D.C. The element will then be allowed to cool to room temperature in the presence of such polarizing voltage and the voltage subsequently removed to complete the polarizing procedure. Simultaneously with radial polarization of the end portions, the portion of element 1 intermediate the input excitation electrodes 11 at top and bottom of such element may be polarized in an axial direction, indicated by the arrows 19, by application of a D.C. polarizing potential of approximately twenty volts per mil axial distance between such electrodes, or 13,000 volts for a spacing of .65 inch. Such intermediate portion constitutes the signal-producing means and is provided with two signal output electrodes 24 and 25 applied to the outer surface of element 1 in symmetrical circumferentially spaced-apart arrangement substantially in the nodal plane 6 between excitation input electrodes. Output electrodes 24 and 25 are connected via corresponding leads to opposite sides of a signal responsive means or indicator 28.

Where it may be found advantageous, in order to simplify the polarizing technique or to accommodate more complex electrode arrangements, for example, the element 1 initially may be divided into sections, polarized independently as to sections, and subsequently cemented together to form a unitary element.

In operation of element 1 in its form as shown in FIG. 8, turning of such element about the input axis 4 during the oppositely-directed vibration of its ends in the radial mode causes a torsional vibration between such ends which results in an A.C. signal output between electrodes and leads 24 and 25 which varies in amplitude in direct proportion to the rate of such turning, and which assumes a phase with respect to the excitation voltage from source 14 according to the direction of such turning.

The frequency of the vibration of the intermediate portion in the torsional mode during signal output is the same as the frequency of the self-driven distributed mass vibration in the radial mode at the opposite ends of element 1, and preferably an excitation frequency is employed which is the natural resonant frequency of vibration of the driven mode, and may readily be obtained by use of this element as a frequency standard for feedback control of the excitation. The dimensions of the element are preferably chosen so that the resonant frequency of the torsional mode is approximately the same as the resonant frequency of the "push-pull radial" mode. The frequency varies with the material and mass of the element 1 and has been found to be within the range of sixty to seventy kc. for a hollow barium titanate cylinder element 1 about 7/8 of an inch long with internal and external diameters of about 3/4 of an inch and one inch, respectively. An excitation source voltage for such an element in the order of 3 volts at a power level of 5 milliwatts, has been used satisfactorily, although it may be preferred to excite the element 1 at other power levels for excitation input to portions 2 and 3.

In the hollow cylinder form of a barium titanate element 1, other input and output electrode arrangements as well as different polariaztion arrangements for the radially-vibrated end portions 2 and 3 and for the signal output portion of such element result in satisfactory operation and have been tried with substantially equal success. The element 1 shown in FIG. 9 is an example of such an alternate arrangement.

The arrangement shown in FIG. 9 includes segmental portions between inner and outer excitation input electrodes 10 and 11, respectively, at one side and at opposite ends of element 1 which are polarized radially, inwardly at the top and outwardly at the bottom. The output signal portion of element 1 then lies on the opposite side of the element between segmental annular output electrodes 24 and 25 on its opposite ends. The output signal producing portion is polarized in a circumferential direction as indicated by the arrows 19. Oppositely-arranged ground electrodes 30 are provided, each of which extend axially along inner and outer surfaces of the hollow cylindrical element and continue radially across its opposite annular end faces. These ground electrodes 30 are spaced-apart circumferentially from the input and output electrodes and are provided to serve the function of electrical isolation between the excitation electrodes and the signal output electrodes.

In the embodiment shown in FIG. 9 it will be appreciated that the end regions 2 and 3 will vibrate in toto in the radial mode to produce the "push-pull radial" or expansion-contraction effect of these end regions as well as the torsionally-responsive reaction effect on the signal output portion, as shown in FIGS. 1 to 5. It will be noted that where the signal output portion is polarized in an axial direction, as in FIG. 8, the signal output electrodes 24 and 25 are located on the cylindrical peripheral surface of element 1 at the nodal plane 6, while these output electrodes 24 and 25 are located on the annular end faces of element 1 in FIG. 9 where the signal output region is polarized in the circumferential direction. This locating of the signal output electrodes is in accord with well-known characteristics of ferroelectric material.

Although the preferred shape of the element 1 is in form of a cylinder for reasons of symmetry and is hollow to facilitate placing of electrodes, it is obvious that other shapes are suitable, such as the solid cylinder of reduced-diameter mid portion of FIG. 10, the solid rectangular parallelepiped of FIG. 11, or the hollow rectangular parallelepiped of FIG. 12. In each of these illustrations the arrows 16 indicate the direction of polarization for the input excitation, the excitation input electrodes are designated by reference numerals 10 and 11, respective to opposite terminals of the A.C. excitation source 14, the arrows 19 indicate the direction of polarity of the torsionally-responsive signal-producing portion, and the output signal electrodes are designated by numerals 24 and 25, in accord with corresponding designations employed in FIGS. 8 and 9. Axis 4 indicates the axis of input motion, or what is referred to herein as the input axis, about which the element 1 of these showings is within limits primarily concerned with linear response.

It is worthy of mention that, as exemplified in the showing in FIG. 8, even though the end regions 2 and 3 be not polarized around their entire circumference, such end regions nevertheless will vibrate in the resonant mode in toto at the resonant frequency when the regions between the pairs of electrodes 10 and 11 are excited by the electric field derived thereby, since the non-polarized regions of these end portions 2 and 3 will vibrate in sympathy with the directly-driven electrode-embraced regions. Such sympathetic vibration in element 1 beyond the directly-driven region also will extend throughout the element 1, in accord with its natural manner of vibration. By spacing the electrodes 10 apart circumferentially as well as the electrodes 11, they may be used both for the initial polarization of the element 1 as well as sensitive to turning for signal output. Theory of operation of these alternate configurations of element 1 follows that as aforedescribed in connection with the hollow cylinder form of such element although in the case of the embodiments shown in FIGS. 11 and 12, the "push-pull" expansion-contraction of their oppositely-arranged portions 2 and 3 will be linear with respect to a vertical plane including the input axis 4, rather than radial with respect to such axis.

Figure 13:
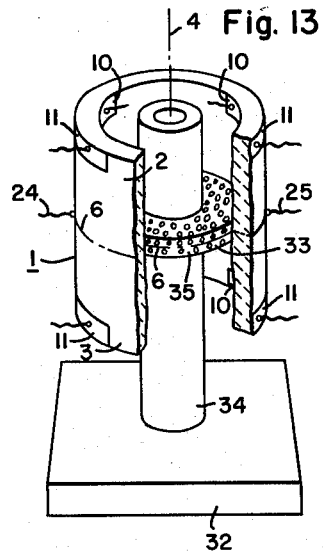
FIGS. 13 and 14 illustrate vibration-isolating mounting arrangements for the self-driven-mass and signal-producing element.
Figure 14:
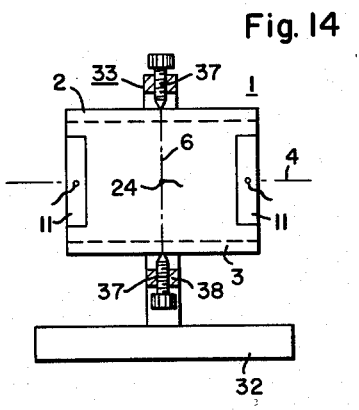

Referring to FIGS. 13 and 14, in any form of the self-vibrated mass and signal-producing element 1, in accord with a feature of the present invention, such element is supported by a base 32 through the medium of mounting means 33 which provides for orientation and turning of the element 1 while assuring its independence as a resonant vibrating system in both its driven and response modes.

FIG. 13 shows a preferred arrangement, particularly suited for use with element 1 in hollow cylindrical form, in which such mounting means 33 takes the form of an annular member 35 of low energy-absorption and of low mechanical impedance, such as epoxy foam which is interposed radially along the nodal plane 6 between a center post 34 affixed to the base 32 and extending centrally through element 1. This material may be foamed in place while the element 1 is independently held spaced from the center post 34 and, upon curing, forms the necessary bond with post and element. Otherwise, such member 35 in foam plastic form may be preformed and fit between and suitably bonded to post 34 and to element 1.

In FIG. 14 such mounting means 33 takes the form of a plurality of support elements 37 carried by a base-mounted frame 38 and in supporting contact with element 1 at a plurality of circumferentially spaced-apart locations around the periphery of element 1 along the nodal plane 6 which is a line of symmetry of such element and effectively constitutes a null region of vibration in both the radially-driven and torsional modes of vibration of such element.

Referring to FIG. 15, in accord with alternate embodiments of the invention, the self-vibrated-mass and signal-producing element 1 may be made of a ferromagnetic or magnetostrictive material, such as nickel, nickel oxide, iron oxide, barium ferrite, etc. The element 1 may take the preferred shape of a hollow cylinder made of the magnetostrictive material which is permanently magnetized for a circumferential direction of flux throughout its length as exemplified in FIG. 15 and indicated by the symbols 42 and 43 at top and bottom of the cross-sectional view of this element as shown. This may be obtained by passing a direct current through a wire (not shown) extended through such element. To obtain excitation of opposite end portions 2 and 3 of element 1 for vibration in the "push-pull radial" mode where one end portion alternately expands and contracts while the other is alternately contracting and expanding, respectively, the end portions 2 and 3 are magnetically coupled to the A.C. excitation source 14 via interior coaxial conductive rods 45 and 46 electrically connected at their outer ends to one source terminal, and an external coaxial cylindrical conductor 47 electrically connected to the other source terminal and to the inner ends of rods 45 and 46 by a plurality of radially-extending circumferentially-spaced-apart wires 50 and 51, respectively, passing through accommodating radial openings in element 1. The innner ends of rods 45 and 46 find mutual support through the medium of one insulating element 52, while the cylindrical conductor 47 gives support to the outer ends of rods 45 and 46 through the medium of annular insulating support elements 53. Element 1 finds support at its nodal plane from insulating element 52 via a member 35 as described in connection with FIG. 13.

During excitation of the element 1 from the source 14 for effecting such "push-pull" radial-mode vibration of its end portions 2 and 3, the alternating current from source 14 will pass along the rods 45 and 46 alternately inwardly and outwardly of element 1 simultaneously via the circuits including the wires 50 and 51 and cylindrical conductor 47. Such current flowing through the rods 45 and 46 will cause the end portions 2 and 3 of element 1 to be subject to alternating circumferential magnetic fields in opposite phase, one end portion with respect to the other, with resultant radial vibration of such end portions in a "push-pull radial" mode.

To read out the reactive torsional signal from the signal-producing portion of element 1 intermediate the push-pull-driven end portions 2 and 3, a signal extracting coil 57 wound around element 1 at its mid portion is provided which is connected across the indicator 28. The torsion mode of vibration in magnetostrictive element 1, resultant from reaction between the "push-pull radial" vibration of end portions 2 and 3 when element 1 is turned about axis 4, develops magnetic flux variations in the mid portion of such element in a direction parallel to axis 4 which are experienced by the coil 57 to produce a signal voltage which is read by indicator 28.

It may also be desirable to fabricate parts of element 1 from a ferroelectric material and other parts from a ferromagnetic material, which parts may be respective to the self-vibrated-mass and the signal-producing portions of such element, for example. Several alternate arrangements in this regard as applied to element 1 in its preferred hollow-cylinder form are exemplified in FIGS. 16 and 17. In FIG. 16 end portions 2 and 3 may be made of ferroelectric material in ceramic form, such as barium titanate, suitably polarized as indicated by arrows 16 in manner as previously described with respect to FIG. 8 for example, and provided with input excitation electrodes 10 and 11 suitably connected to excitation source 14 for the "push-pull radial" vibration of portions 2 and 3. The intermediate portion of element 1, constituting the signal-producing portion, may be made of ferromagnetic material, such as nickel, suitably bonded to portions 2 and 3 and permanently magnetized for a circumferential flux pattern, indicated by symbols 42 and 43, to produce a torsion-reaction signal flux experienced by pickoff coil 57 connected to the indicator 28, when element 1 is turned about the input axis 4.

In FIG. 17 the combined ferroelectric and ferromagnetic element 1 may take the form of a coaxial assemblage in which inner and outer hollow cylinders of the two materials, respectively, are bonded together to form an integral mass. The inner cylinder may be made of ceramic material such as barium titanate having suitably polarized end portions 2 and 3, arrows 16, and coated with input excitation electrodes 10 and 11 at interior and exterior, respectively, which are connected to source 14 to obtain the desired "push-pull radial" vibration of such portions, as willl be apparent from previous description. The outer cylinder of FIG. 17 may be made of nickel, for example, suitably magnetized as indicated by the symbols 42 and 43 and provided with pickoff coil 57 to respond to the torsional reaction between portions 2 and 3 upon turning of the element 1 about axis 4 as also will be understood from previous description.

It may be advantageous, from performance and fabrication standpoints, to make element 1 of a homogeneous mixture of ferroelectric and ferromagnetic materials, as shown in FIG. 18. In such form element 1 may be fabricated by mixing in powdered form a ferroelectric material such as barium titanate or lead zirconium titanate, for example, with a ferromagnetic material such as nickel oxide, iron oxide, or barium ferrite, for example, and molding and curing as by application of heat and pressure to produce the rigidity and shape. Following this, the element 1 of composite ferroelectric and ferromagnetic material is subjected while at the necessary temperatures to the required direct current voltage for radial polarization, as indicated by arrows 16, of the ferroelectric material within the composite material. Independently of such polarization the magnetic field is applied to achieve the circumferential remanent field, symbols 42 and 43, in the ferromagnetic material within the composite material. The input electrodes 10 and 11 are then applied for excitation of the ferroelectric material in end portions 2 and 3 to operate in the push-pull vibratory mode, as is apparent from previous description, and the pickoff coil 57 added to the intermediate signal-producing portion for extracting the torque-reactive magnetostrictive response of such portion during turning of the element about the input axis 4. In this combined ferroelectric and ferromagnetic material of which element 1 is composed in FIG. 18, the relative natures of such materials affords the necessary integral mechanical association between the self-vibrated-mass portions 2, 3 and the intermediate signal-producing portion while maintaining electrical and magnetic isolation between the intermixed ferroelectric and ferromagnetic particles, respectively. It will be appreciated that, in the fabrication of element 1 as a mixture of ferroelectric and ferromagnetic materials, such mixture need not be homogeneous throughout such element, but rather may easily be varied in relative concentrations respective to the self-vibrated-mass and signal-producing portions.

Although the several embodiments have been described in connection with the driven mode, as being radial and the output mode as being torsional, it should be pointed out that this may be reversed. The input excitation can be applied torsionally to the element 1, to produce relative vibratory turning of portions 2 and 3, which, when combined with a turning velocity of element 1 about input axis 4, results in a differential angular velocity causing differential radial strains of the two portions, giving an output signal from the electrodes 10 and 11 heretofore considered in connection with input excitation.

Thus it will be apparent that any of the embodiments previously described may be made to operate in reverse, i.e., the input electrodes may be substituted for the output electrodes, and vice versa.

While the invention has been described with a degree of particularity and especially in conjunction with certain configurations and certain ferroelectric and ferromagnetic materials for the element 1, it will be apparent that the description of the invention as set forth herein will suggest, to those versed in the art, modifications within the scope of this invention as defined by the appended claims, without departing therefrom. For example, the element 1 conceivably may be constructed of a ferroelectric crystal material such as quartz, even though the orientation of its crystallographic axes presents certain difficulties with respect to the obtaining of the duality of balanced self-vibrated mass portions, "push-pull" effect for reaction of one portion with respect to the other, in conjunction with signal output from yet another portion, all as a monolithic or intimately-associated, compact configuration.

We claim as our invention:

1. In a vibratory gyro device having a base and an input axis for response to rate of turning thereabout, an integrally-associated assemblage of substantially constant cross-sectional mass distribution comprising self-driven vibratory mass portions disposed at opposite sides of said axis for driven vibration in a linear mode in a radial direction relative thereto and extending along said axis for relative vibration of such portions 180° out of phase at opposite sides of a nodal plane perpendicular to said axis, means carried by said base and supporting said assemblage in the vicinity of said nodal plane whereby a vibratory reaction torque is realized exclusively between such portions at opposite sides of said nodal plane upon being turned about said input axis, and a signal-producing portion responsive to said reaction torque.

2. In a vibratory gyro device having an input axis for response to rate of turning thereabout, an integrally-associated assemblage comprising self-driven vibratory mass portions disposed at opposite sides of said axis for linear-mode vibration in a radial direction relative thereto in their driven mode and extending along said axis for relative vibration of such portions 180° out of phase at opposite sides of a nodal plane perpendicular to said axis, whereby a vibratory reaction torque is realized between such portions at opposite sides of said nodal plane upon being turned about said input axis, a signal-producing portion responsive to said reaction torque, a mounting base, and means connecting said assemblage to said base for transmittal of input turning effort while assuring omni-directional vibratory independence of such assemblage from said base.

3. A vibratory gyro device having an input axis for response to rate of turning thereabout, a hollow cylindrical element coaxial with said input axis of ferroelectric material polarized at its opposite ends for vibration in a direction normal to said input axis, electrode means on inner and outer cylindrical surfaces of said element at its said ends for radial vibration thereof 180° out of phase with respect to each other, a portion of said element being polarized for signal-producing response to a vibratory torque reaction between said ends upon turning of said element about its axis, and electrode means on said element for extracting an alternating output signal from said portion.

4. A vibratory gyro device having an input axis for response to rate of turning thereabout, a hollow cylindrical element coaxial with said input axis of ferroelectric material polarized radially at its opposite ends, electrode means on inner and outer cylindrical surfaces of said element at its said ends for radial vibration thereof 180° out of phase with respect to each other, a portion of said element being polarized for signal-producing response to a vibratory torque reaction between said ends upon turning of said element about its axis, electrode means on said element for extracting an alternating output signal from said portion, a mounting base, and means connecting said element to said base for transmittal of input turning effort about said axis while assuring omni-directional vibratory independence of said element from said base.

5. A vibratory gyro device having an input axis for response to rate of turning thereabout, a hollow cylindrical element coaxial with said input axis of barium titanate polarized radially at its opposite ends, electrode means on inner and outer cylindrical surfaces of said element at its said ends for radial vibration thereof 180° out of phase with respect to each other, a portion of said element being polarized for signal-producing response to a vibratory torque reaction between said ends upon turning of said element about its axis, and electrode means on said element for extracting an alternating output signal from said portion.

6. In a vibratory gyro device having an input axis, an elemental assemblage comprising directly-coupled self-driven mass and signal-producing portions of poled ferroelectric and magnetized ferromagnetic materials, respectively, said self-driven mass portion being constructed and arranged to vibrate in a direction normal to said input axis and said signal producing portion being reactive to said mass portion when turned about said axis.

7. In a vibratory gyro device having an input axis, an elemental self-driven mass and signal-producing assemblage of composite ferroelectric and ferromagnetic material having polarized and magnetized portions for electrostrictive and magnetostrictive operation, said assemblage being constructed and arranged for its mass to be vibrated at least in part in a direction normal to said input axis and to produce a signal as a result of turning of the assemblage about said input axis during such vibration of said mass.

8. A vibratory gyro device comprising a mounting base; an element having self-driven vibratory mass portions; excitation means on said element; signal extracting means on said element; and omni-directional vibration-isolating mounting means interposed between said base and a vibrational nodal region of said element; all of the aforesaid being constructed and arranged to effect vibration of said element in a straight-linear driven mode and while thus vibrating to vibrate also in a torsional mode as a reaction between driven-mode vibrating portions of said element to produce an output signal in response to turning movement of said base about an input axis.

9. A vibratory gyro device comprising a mounting base; a monolithic element of material exhibiting piezoelectric properties, said element being of substantially uniform cross section and having self-driven vibratory mass portions; excitation and signal-extracting electrode means on said element; and omni-directional vibration-isolating mounting means interposed between said base and a vibrational nodal region of said element; all of the aforesaid being constructed and arranged to effect vibration of said element in a straight-linear driven mode and while thus vibrating to vibrate also in a different mode as a reaction between driven-mode vibrating portions of the element to produce an output signal in response to turning movement of said base about an input axis.

10. In a vibratory gyro device having an input axis for response to rate of turning thereabout, an intimately-associated assemblage of uniform cross-sectional mass distribution along said axis comprising self-driven portions of poled ferroelectric material creative of a torsional vibratory stress condition exclusively as a reaction between such portions in response to their being turned about said input axis while vibrated in a straight-linear mode in a direction normal to said axis, and a signal-producing portion of poled ferroelectric material for response to said vibratory stress condition.

11. In a vibratory gyro device having an input axis for response to rate of turning thereabout, an intimately-associated assemblage of uniform cross-sectional mass distribution along said axis comprising self-driven portions of magnetized ferromagnetic material creative of a torsional vibratory stress condition exclusively as a reaction between such portions in response to their being turned about said input axis while vibrated in a linear mode in a direction normal to said axis, and a magnetized signal-producing portion of ferromagnetic material for response to said vibratory stress condition.

12. A vibratory gyro device comprising, an assemblage of coaxial contiguous hollow cylinders, one of which is polarized and of electrostrictive material and the other of which is magnetized and of magnetostrictive material; excitation means on one of said cylinders; signal extracting means on the other of said cylinders; the respective polarization and magnetization patterns of the two elements in conjunction with the arrangement of the respective excitation and signal extracting means being such that one of the two coaxial contiguous cylinders will be excited electrically to vibrate the assemblage for producing a vibratory strain therein as a reaction between mass portions of such assemblage during turning movement thereof about an input axis, and the other of said cylinders will sense such vibratory strain for producing an output signal.

13. A vibratory gyro device comprising, an assemblage of two coaxial contiguous cylinders, the inner one being of piezoelectric material and polarized radially and an outer one being of magnetostrictive material and magnetized circumferentially; excitation means including input electrode means on the inner cylinder; the aforesaid being constructed and arranged for vibration of the assemblage radially in a 180° out-of-phase relationship between radial vibration at opposite sides of its mid-plane along the axis to give a vibratory torque strain reaction in the region of such mid-plane when the assemblage is turned about its axis; and coil means encircling the outer cylinder in such mid-plane region for extracting a signal produced magnetostrictively responsively to such torque strain reaction.

References Cited by the Examiner
UNITED STATES PATENTS

| 2,544,646 | 3/51 | Barnaby | 73—505 |
| 2,627,400 | 2/53 | Lyman | 73—505 |
| 2,683,247 | 7/54 | Wiley | 73—505 |
| 2,683,596 | 7/54 | Morrow | 73—505 |
| 2,724,171 | 11/55 | Wallace | 310—8 |
| 2,963,911 | 12/60 | Pratt | 73—517 |
| 2,974,530 | 3/61 | Jaouen | 73—505 |

RICHARD C. QUEISSER, Primary Examiner.

JAMES J. GILL, SAMUEL LEVINE, JOSEPH P. STRIZAK, Examiners.